(12) United States Patent
Nolte et al.

(10) Patent No.: US 6,272,475 B1
(45) Date of Patent: Aug. 7, 2001

(54) APPARATUS AND METHOD FOR THE SECURE DISPENSING OF BANK PAPERS

(75) Inventors: Michael Nolte, Brakel; Richard Weigold, Bielefeld, both of (DE)

(73) Assignee: Siemens Nixdorf Informationssysteme Aktiengesellschaft, Paderborn (DE)

(*) Notice: Subject to any disclaimer, the term of this patent is extended or adjusted under 35 U.S.C. 154(b) by 0 days.

(21) Appl. No.: 09/148,614

(22) Filed: Sep. 4, 1998

(30) Foreign Application Priority Data

Mar. 23, 1998 (DE) .............................. 198 12 648

(51) Int. Cl.⁷ .................................. G06F 17/60
(52) U.S. Cl. .................. 705/43; 705/44; 705/1
(58) Field of Search .................. 235/379, 380; 705/1, 41, 43, 44, 65, 67

(56) References Cited

U.S. PATENT DOCUMENTS

| | | |
|---|---|---|
| 3,675,816 | 7/1972 | Bourke, II et al. . |
| 3,845,277 | 10/1974 | Voss et al. . |
| 3,956,615 | 5/1976 | Anderson et al. . |
| 5,291,560 * | 3/1994 | Daugman ............................. 382/117 |
| 5,604,341 * | 2/1997 | Grossi et al. ........................ 235/379 |
| 5,606,157 * | 2/1997 | Awatsu et al. ....................... 235/379 |
| 5,917,168 * | 6/1999 | Nakamura et al. .................. 235/379 |

FOREIGN PATENT DOCUMENTS 27 17 345 A1   11/1978 (DE) .

* cited by examiner

*Primary Examiner*—Reba I. Elmore
(74) *Attorney, Agent, or Firm*—Schiff Hardin & Waite

(57) ABSTRACT

Apparatus and method for the secured dispensing of bank papers. A signed enable message contains an overall value of the bank papers to be dispensed. A verifier checks the signature and the overall value is compared with the sum of the values of the bank papers to be dispensed. From the comparison and the incorporation of the testing of the signature, a blocking signal for the dispensing from a dispense opening is produced, as long as the signature is invalid or the overall value is smaller than the sum.

30 Claims, 1 Drawing Sheet

APPARATUS AND METHOD FOR THE SECURE DISPENSING OF BANK PAPERS

BACKGROUND OF THE INVENTION

The invention relates to apparatus and methods for the secure dispensing of bank papers.

Apparatuses for the dispensing of bank papers in the form of banknotes are known as automatic teller machines (ATMs).

In DE OS 27 17 345, a dispenser is shown that assembles and dispenses banknotes from magazine stores. In U.S. Pat. No. 3,945,277, an autonomous teller apparatus is specified in which cards with magnetic strips are used to code the account to be debited and the maximum quantity of the amount respectively to be dispensed. In U.S. Pat. No. 3,675,816, an automatic teller machine is likewise specified in which the data of a machine-readable check are compared with the data of a magnetic card in order to permit a payment. In U.S. Pat. No. 3,956,615, an automatic teller machine is specified in which for each payment or transaction a communication takes place, via a data communication means, with a central authorization computer, which simultaneously authorizes and logs the payment. The disclosure of the patent documents are fully incorporated herein by reference.

All known arrangements have in common that the control means, the dispenser, also called the decollator, the reading apparatuses for documents or magnetic cards, etc., are housed in the interior of a protected housing or safe, so that no unauthorized access to it is possible. Of course, the control unit must thereby be protected by the safe as well, because otherwise it would be possible to manipulate the control circuit for the purpose of dispensing money without authorization. As long as the control unit is developed specifically for this purpose and is of low complexity and power, this does not represent a particular problem.

However, to the extent that commercially available personal computers, with correspondingly complex operating systems and programs with several megabytes of code, are used as control computers, security monitoring of the software is extremely expensive. In addition, the actual problem-free exchange of modules always entails an opening of the safe, which as a rule may take place only under specific supervision.

SUMMARY OF THE INVENTION

An object of the invention is to provide an apparatus or station for dispensing bank papers stored in a secure way, in which the components are arranged or, respectively, operated in such a way that the execution control unit can be located predominantly outside the safe that protects the bank papers.

To that end, in accordance with the invention, monitoring is provided in such a way that the (maximum) amount of each payment is limited independent of the rest of the control means, in that dispensing is blocked when the respectively authorized amount is exceeded.

In an embodiment, the invention provides an apparatus and method for the secure dispensing of bank papers, whereby a signed enable message contains an overall value of the bank papers to be dispensed, a verifier checks the signature, the overall value is compared with the sum of the values of the bank papers to be dispensed, and, from the comparison and inclusion of the checking of the signature, a blocking signal for the dispensing from a dispense opening is produced if the signature is invalid or the overall value is smaller than the sum.

For simplicity, the term "bank paper", unless otherwise specified, is used herein for various objects and/or documents to which a numerical value is allocated, including, but not limited to, coins, pawn tickets, tickets to events, airline tickets, etc., as is further explained below.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

Figure 1:
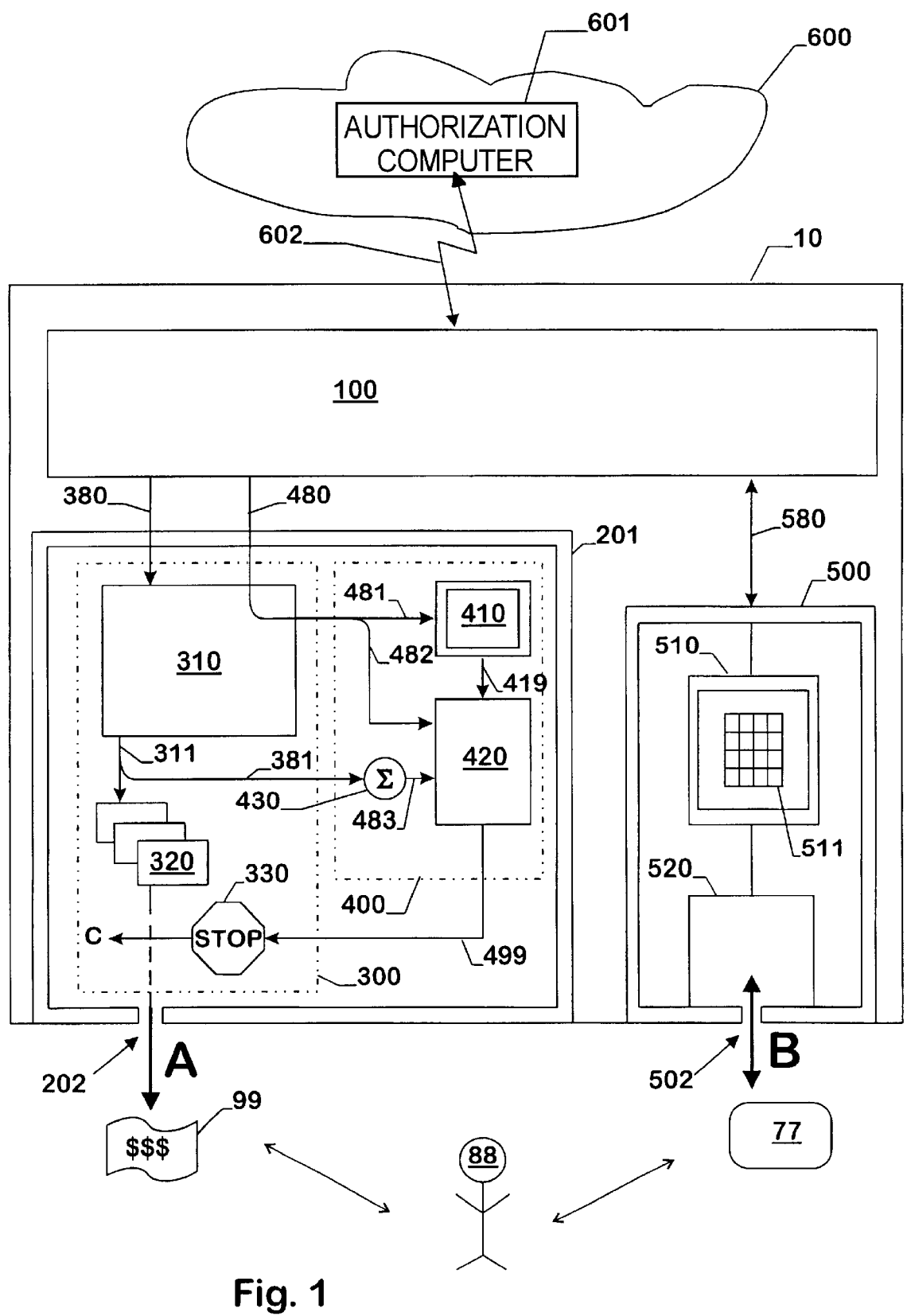
FIG. 1 illustrates a block diagram of an apparatus for dispensing bank papers.

FIG. 1 shows an apparatus 10 for dispensing bank papers. It contains a control unit 100 that initiates and monitors the processes in the apparatus. Control unit 100 is also responsible for general communication with a user, and can be connected with a display screen and a keyboard or a pointer apparatus (mouse) for these purposes. These communication means (not shown) serve for example to receive the type and quantity of the bank papers to be dispensed in a dialog, and, insofar as is useful, the denominations or other instructions.

Via a connection 380, the control unit 100 is connected to a dispenser 310, which can provide a number of bank papers 320 from a store (not shown) for dispensing in the direction of the arrow A and can dispense them via a dispense opening 202.

The dispenser 310 is a combination of mechanical and electronic means, as shown for example in the cited DE OS 27 17 345, fully incorporated herein by reference. The control unit 100 transmits tasks to the dispenser 310 via the connection 380. Such tasks comprise in particular the selection of a number of bank papers from a determined magazine, and the provision and final dispensing thereof from the dispense opening 202.

To this extent, this arrangement is generally known; the additional components shown in FIG. 1 inside the housing 201 are specific for the invention and are explained in more detail below.

An automatic teller machine used predominantly up to now according to the prior art provides, in addition, an authenticator 500, which usually contains a magnetic or chip card reader 520. A person 88 using the machine inserts an identity card 77 into the input slot 502 of a card reader. The card 77 is thereupon checked. The data are relayed to a security module 510, protected against manipulations by a separate housing. In the protected area, there is a keyboard 511 for the input of a secret number. After the input thereof, the security module 510 sends a message, usually encrypted, via the connection 580. This is usually sent to an authorization computer 601 via the control unit 100 and a data transmission connection 602 of network 600. The message of the security module 510 is thereby supplemented by the control unit by the desired amount of payment, if this was not already communicated beforehand to the security module 510 and contained in the encrypted message.

In the authorization computer 601, an accounting entry is then carried out and a response is sent back to the control unit 100. The user operating the station thereby determines if and when the account transaction terminated in the authorization computer. Typically, the authorization computer 601 first sends a command for the provision of the bank papers, which is confirmed in the final dispensing through the dispense opening 202 and terminates the transaction. Other protocols, for example, in which a cancellation is provided, are likewise possible. As can be seen, the invention effects precisely a decoupling of authorizations from the actually used protocol which controls the dispensing in detail.

In the simplest case, the response contains an indication that the desired amount has been logged and can now be paid out. The control unit 100 gives the corresponding commands to the payment unit 310 via the connection 380, and the payment unit provides the bank papers 320 to be paid out (or has already provided them) and now dispenses them via the dispense opening 202.

For the case in which no on-line connection 602 is possible, the enabling of a payment can also take place via the security module 510. In this case, the values paid out are stored and are communicated to the authorization computer 601 later.

It can be seen that security against unauthorized payments in this previously used structure depends in particular on the correct functioning of the control unit 100, which is thus contained, together with the payment unit 310, in a particularly secure safe, which can generally be accessed only using two keys according to the "four eyes" principle.

After the opening of the safe, both the supply container for the bank papers and also the control unit 100 and the payment unit 310 are freely accessible.

The invention makes it possible to position the control unit 100 outside the safe and to replace it with essentially simplified means which are in particular no longer involved given changes in the communication with the user, the data transmission connection 602, and other changes that are irrelevant from a security point of view.

According to the invention, in the station 10, a control unit 100 is additionally provided, which however does not need to be secured in any particular way and whose characteristics are not important for security against unauthorized payments, and thus for the invention. In the station, there is a safe 201 in which, on the one hand, the known payment unit 310 is contained together with a store of bank papers. The safe additionally receives, via the connection 380, commands from the control unit 100, which can thus remain essentially unchanged.

The components contained in the test module 400 are new additions. In the preferred embodiment, the test module is realized as a chip card, i.e., an integral unit with an interface, a processor and a memory; alternatives and variants are presented below.

On the one hand, as was previously also the case commands are given to the payment unit for the provision of one or more bank papers 320 via the connection 380.

A payment unit 310 is thereby used that enables a determination of the numerical value of the bank papers 320 independently of the control unit 100. This can take place in that a station (not shown) is provided that matches the selected bank papers and calculates the value. It can also be provided that the bank papers are arranged in magazines or other storage units, and that these contain a memory that contains the numerical value of the stored bank papers and can be set by the person who places the bank papers in the magazine. It is also possible that these numbers are transmitted by the control unit and are stored in the payment unit 310, but that these indications can be checked via a display means (not shown) by the person closing the safe. A switch, e.g. activated by the closing of the safe, then blocks this memory against further modifications.

In the embodiment shown in FIG. 1, the values are determined during the provision of the bank papers 320, and, symbolized by the connection 381, are relayed to a summation unit 430. As indicated by means of the connection 483, the respective sum is provided to a comparator 420.

In addition, in accordance with the invention, a verifier 410 is provided. This verifier 410 preferably is a chip card or, respectively, is contained in such a card, for which a manufacturing technique is known and a number of communication protocols are standardized. A chip card or another module with an interface, a processing unit and an internal memory not directly accessible via the interface has the advantage that it provides an optimally secure storage for a key, if the subsequently executed signature check uses cryptographic methods and thus requires a secret key.

As also illustrated, the verifier 410 receives an enable message. This transmission is symbolized by a connection 480 from the control unit 100 to the verifier 410. The enable message is in practice generally transmitted via the interface via which the control unit is already connected with the payment unit 310, and is forwarded by the payment unit to the verifier 410. This is the preferred solution, because the interfaces then remain local inside the safe 201. Since, however, the payment unit does not modify the enable message, a connection 480 is shown structurally from the control unit 100 to the verifier 410.

The production of the enable message is specified below.

First, it is determined that in addition to management information, the enable message contains an overall value. The overall value is a number that is logically commensurate with the numerical values allocated to the bank papers or, respectively, a sum thereof.

In addition, the enable message comprises a signature for the protection of the overall value from falsification. This signature is preferably a signature secured cryptographically according to the prior art, e.g. a message authentication code, MAC, according to the data encryption standard DES. Alternatively, other methods, in particular those designated as 'public key' methods, can be used. It is also possible that the enable message contains redundancy, is encrypted with DES or with another suitable method, and the redundancy can be checked after the de-encryption. As is known, this procedure secures an enable message both against falsification, as is required here, and also against espionage. The use of a chip card is hereby useful and preferred, since the required secret key for the signature check can be stored in the memory so as to be well-protected against espionage. However, it should be noted that any module can be used that can reliably check the signature of a message; the selection will take place according to considerations of cost, ease of use and degree of security sought.

If the signature shows that the message is not falsified, the overall sum contained therein can be deducted and supplied to the comparator 420. From the logical structure, the comparator receives the overall sum from the message as well as a binary signal that indicates that the overall sum is valid. Thus, in FIG. 1, a division of the connection 480 into a connection 481 for the transmission of the signature and a connection 482 for the overall sum is symbolized. However, this is preferably easily coded in that the verifier 410 extracts the overall sum and outputs an overall sum of zero if no matching signature is present; i.e. an overall sum of zero indicates its invalidity, and an overall sum greater than zero indicates its validity. If the signature is formed with redundancy by means of the encryption of a message, the overall sum can also be provided only by the verifier 410 or, respectively, the test module 400. If, in contrast, a signature method without encryption is used, in which the overall sum can be learned from the enable message immediately and is protected by the signature only against modification but not against espionage, then the overall value can also be deducted by the payment unit 310 and supplied to the comparator 420. The comparator 420 then receives only the validity signal indicated by the connection 419 from the verifier 410. In terms of security, this is possible insofar as the dispenser 310 has to be included anyway with lessened security.

The comparator 420 produces a blocking signal 499 that is present as long as either the validity signal 419 is missing or the target sum exceeds the overall sum. This blocking signal 499 acts on a block 330, which, if activated, as indicated by the arrow C, prevents a dispensing of bank papers through the dispense opening 202.

A large number of alternatives are available for the construction of the block 330. It can be an electromagnetically actuated flap, which is opened only given the absence of the blocking signal. The verifier can then thereby be arranged immediately at the actuator of the flap, in order to make a manipulation of the blocking signal 499 more difficult.

However, a solution is preferred in which the payment unit is controlled by a microcontroller. A receptacle for a chip card as a test module 400 is attached immediately to the microcontroller. Both the enable message 480 and also the numerical values 381 or the sum thereof 483 and also the blocking signal 499 are transmitted to the chip card via a single physical interface, whose messages are determined by the program of the microcontroller controlling the payment unit 310 and are evaluated by it. This makes an influencing of this connection more difficult. This is because if the blocking signal is present separately, a message of only one bit information content would have to be secured, which is problematic, as is known. For example, the enable message can contain a transaction number, and the blocking signal can be constructed in inverted fashion as an enable signal, containing the transaction number and signed by the test module with a simple signature method. The block 330 is then integrated into the payment unit 310, as symbolized by the frame 300 in FIG. 1.

If a transaction number is used in the enable message, it is preferably secured along with the signature. Other information, not relevant here, can also be protected by the signature; the validity signal 419 can then also be made accessible to the payment unit 310 and the control unit 100.

Instead of a transaction number from a previously agreed-upon list, a sequence number can also be used, so that the verifier can recognize lost and repeated enable messages as such and reject them. This sequence number is also secured by the signature.

Another development also uses a chip card for the control program of the dispenser 310, so that two chip cards are present in the safe, which must match one another in order to enable dispensing of bank papers.

In the preferred embodiment, the verifier 410, the comparator 420, and the summation unit 430 are integrated into the test module 400 and are constructed as a chip card, because this card can easily produce the necessary storage and computing power. However, as already stated, in a variant of the invention, the summation unit 430 and the comparator 420 can also be housed in the control program of the payment unit, especially if this unit is sealed (i.e,. secured) or is constructed as a chip card. This also holds for the deduction of the overall sum if the enable message is only signed and is not encrypted.

A particularly advantageous development occurs when at least the security-relevant parts of the control unit of the payment unit 310, as well as the test module 400, are housed completely in a chip card. In this way, the control unit inside the safe 201 can be monitored by the operator in the same way as the bank papers to be dispensed. In particular, the chip card and bank papers can easily be removed, and for example replaced by a chip card for maintenance purposes. During the filling process, the operator of the station need only provide not only the bank papers, but also a chip card kept in safe keeping by him, in order to be secured against manipulations of the software.

So far it has not been stated how the named components are reset into an initial state or, respectively, after the end of a dispensing process designated a transaction. These signals are standardly replaced by the control unit 100 or by timing elements of the payment unit 310 and of the verifier 410. However, the techniques for this are known to those skilled in the art, so that a further presentation here would be superfluous.

It was assumed in the specification up to now that several bank papers 320 are prepared and then dispensed together. The dispensing of a single bank note is thereby also logically included, in particular if the value of the bank note is equal to the overall value. In this collective dispensing, the enable message must first be present immediately before the dispensing through the dispense opening 202; the assembly of the bank papers and the transmission of the enable message to the verifier can thus take place in chronologically overlapping fashion. For an incremental dispensing, the enable message must be present before the dispensing of the first bank note, in order to deactivate the blocking signal.

Up to now, the specification has made use of a comparator that compares for a "less than or equal to" state. It is also possible to limit the monitoring to equality alone. This means an increase of security, but also a reduction of flexibility. Nothing changes in the basic idea of the invention, so that a comparator of this sort is to be regarded as equivalent.

The invention has been explained in relation to an embodiment in which the enable message contains an overall sum, the bank papers have a single numerical value, and their sum is formed in order to achieve a constraint or limitation on the dispensing. However, the invention is not limited to this. Thus, the enable message can contain several values, e.g. in different currencies, and an indicator of how the different values are to be combined, here as an exclusive OR. An overall value can also be indicated in a standard currency together with the current exchange rate authorized by the authorization computer, in order to permit dispensing in mixed values. In this case, the determined numerical values 381 must be supplemented by a currency indication which can thus be generally designated as value features. The corresponding procedures are then to be carried in the comparator 420 and the surrounding parts, for which reason the concept of a limiter is presented as a generalized concept.

A variation of the invention can use a verifier 410 that contains an unambiguous number for identification. In this case, the enable message also contains this number of the verifier 410 and secures it together with the overall value.

This provides security against the use of an enable message in a station for which it is not intended.

Corresponding to the object of the invention, the control unit 100 does not play a logically necessary role, even if in practice its communication behavior and reliability play a large role in its customer acceptance. In relation to the invention, however, the control unit transports only the enable message, and produces, from whatever sources, the dispensing tasks. The enable message could thereby be transmitted by the authorization computer even completely separate from the control unit, e.g. in wireless fashion.

It is even unimportant whether the enable message from a particular authorization computer reaches the verifier along a particular path. It is thus also not important for the invention whether and in which form an authenticator 500 is provided with a card reader 520 and a security module 510. Corresponding to the system standardly used up to now, the authenticator 500 produces a message and sends it via the connection 580, which message causes the authorization computer 601 to produce an enable message, or also not to produce one. Alternatively, though perhaps not optimally for the dispensing of bank papers, a known biometric authentication method can be used that makes use of the rhythm of a keyboard input to the authorization computer 601. Prepared transaction numbers, as in home banking, as used up to now with the German BTX system, can also be used. No authenticator is then required at all, because the rhythm of the keyboard input is different every time, or, respectively, a transaction number loses its value after being used.

An authorization computer is also not logically necessary if a solution with transaction numbers is selected. A number of unused transaction numbers is hereby deposited in the verifier. For each payment, the customer inputs a transaction number which then represents the signature in the enable message. Each transaction number contained in an enable message is a generalized signature that secures a limit, and is deleted from the list after the receipt of a message. For each transaction number, the value and the type of the limit can thereby be noted, so that the control unit 100 can indeed produce an enable message, but the verifier in addition ensures that the limit is valid, and the limiter ensures that the dispensing instructions transmitted parallel thereto are executed only if the verifier has received a validly secured enable message.

The invention has been specified for the dispensing of bank papers, typically banknotes. However, the precondition of this is only that, during the dispensing, value features allocated to the objects to be dispensed can be automatically determined, compared, and, if warranted, summed. Examples of this include stored bank papers and also coins, whereby either reliable methods are used for the determination of the value thereof or the values are inputted by the operating person during placement in the safe. The latter can of course also take place by means of marking of e.g. magazines.

Alternatively, the dispenser may determine the value only during the dispensing, as is the case for example for tickets and coupons. A multi-media application can support the customer in the selection of the seat location for a public event and then first print the seat number and the price during the dispensing. The dispenser can thereby determine the sum of the values of the bank papers to be dispensed, so that the invention remains applicable.

Although the bank papers are preferably first collected and then released together through the dispense opening, an incremental dispensing is also possible. A subtraction is thereby not necessary, as long as the value of the bank paper to be dispensed is added to the sum timely enough that the blocking signal can at least still prevent the dispensing of this bank paper.

Of course, the comparator can also be formed by a subtraction unit that deducts the value of the next bank paper to be dispensed from the checked overall value, and thus maintains a residual value. Since the comparator is in any case preferably realized by the programming of the microcontroller that controls the dispenser, a multiplicity of variants are known to those skilled in the art. Attention is to be called to the fact that this microcontroller does not receive any direct inputs from the user; this task is taken over by the above-named control unit. It is conceivable to have only a final enable key, a photo-electric barrier, a proximity sensor, or the like.

Although modifications and changes may be suggested by those skilled in the art, it is the intention of the inventors to embody within the patent warranted hereon all changes and modifications as reasonably and properly come within the scope of their contribution to the art.

What is claimed is:

1. An apparatus for dispensing bank papers comprising within a secure housing:
   a) a verifier, comprising:
      i) an input for the reception of an enable message external to the housing and containing a constraint in the form of one or more limit values as well as a signature, which signature protects the constraint against falsification;
      ii) a means for checking the signature, which, given a valid signature, provides a valid constraint for a limiter; and
      iii) an output in the form of a validity signal with the valid constraint
   b) a dispenser apparatus comprising:
      i) a dispenser with an input for the reception of a dispense task signal external to the housing and requesting one or more dispense tasks, which induces the dispensing of one or more bank papers;
      ii) an input for a blocking signal;
      iii) a bank paper store in which bank papers can be stored: and
      iv) a means that determines value features of the bank papers to be dispensed and provides these features to the limiter; and
   c) the limiter, the limiter being controlled independently of the dispenser and configured to emit the blocking signal as long as no valid constraint is present or the value features do not fulfill the constraint,
   wherein
   the apparatus for dispensing bank papers is configured such that the blocking signal prevents final dispersion of bank papers failing to meet the constraint.

2. The apparatus of claim 1, wherein
   a) the value features comprise a numerical value that is commensurate with a limit value of the enable message;
   b) the numerical values of the bank papers respectively to be dispensed are respectively summed to form a target sum; and
   c) the limiter checks whether the constraint is fulfilled by checking whether the target sum is smaller than the limit value.

3. The apparatus of claim 1 or 2, wherein the verifier, the dispenser and the limiter are protected against unauthorized access in at least the same way as the bank papers to be dispensed.

4. An apparatus for dispensing bank papers comprising within a secure housing:
  a) a verifier, comprising:
    i) an input for the reception of an enable message external to the housing and containing a constraint in the form of one or more limit values as well as a signature, which signature protects the constraint against falsification;
    ii) a means for checking the signature, which, given a valid signature, provides a valid constraint for a limiter; and
    iii) an output in the form of a validity signal with the valid constraint;
  b) a dispenser apparatus, comprising:
    i) a dispenser with an input for the reception of a dispense task signal external to the housing and requesting one or more dispense tasks, which induces the dispensing of one or more bank papers;
    ii) an input for a blocking signal;
    iii) a bank paper store in which bank papers can be stored; and
    iv) a means that determines value features of the bank papers to be dispensed and provides these features for the limiter; and
  c) a limiter which emits a blocking signal as long as no valid constraint is present or the value features do not fulfill the constraint, the blocking signal preventing dispersion of bank papers failing to meet the constraint,
  wherein, the verifier has stored in it a serial number that is unambiguous for each verifier, and the signature is regarded as valid only if this serial number is also contained in the enable message.

5. The apparatus of claim 1, wherein the verifier is contained in a test module that comprises an interface, a processor and a memory, and in which access to the memory via the interface can take place only with intervention by the processor.

6. The apparatus of claim 5, wherein the test module in addition comprises the limiter.

7. The apparatus of claim 5 or 6, wherein the test module comprises a permanent memory in which the payments carried out are recorded.

8. The apparatus of claim 5 or 6, wherein the test module is a chip card.

9. The apparatus of claim 8, wherein the dispenser comprises a control electronics unit on which a receptacle for the chip card is immediately arranged.

10. The apparatus of claim 1, wherein the blocking signal is adjacent to the dispenser.

11. The apparatus of claim 1 or 2, wherein the dispenser comprises the limiter.

12. The apparatus of claim 1, wherein parts of the control unit of the dispenser are located in a chip card.

13. The apparatus of claim 12, wherein the control unit of the dispenser is located in the same chip card as the verifier.

14. The apparatus of claim 1, wherein the bank papers belonging to an enable message are dispensed collectively.

15. The apparatus of claim 1, wherein the value features are attached to the bank papers during the dispensing process.

16. A method for the operation of an apparatus for dispensing bank papers enclosing a dispenser, a verifier and a limiter, said method comprising the steps of:
  transmitting an enable message from a source external to the apparatus to the verifier, which enable message contains a constraint in the form of one or more limit values, as well as a signature, which secures the constraint against falsification;
  checking the signature with the verifier to see whether a valid constraint is present, and transmitting this constraint to a limiter;
  transmitting one or more dispense tasks to a dispenser, from a source external to the apparatus, the dispenser thereupon dispensing of one or more bank papers, and, for each bank paper to be dispensed, determines one or more value features and transmitting these value features to the limiter;
  producing a blocking signal with the limiter as long as no valid constraint was transmitted by the verifier or the value features transmitted by the payment unit do not correspond to the constraint;
  preventing dispensing the bank papers determined by the dispense tasks.

17. A method for the operation of an apparatus for dispensing bank papers enclosing a dispenser, a verifier and a limiter, comprising the steps of:
  transmitting an enable message from a source external to the apparatus to the verifier, which enable message contains a constraint in the form of one or more limit values, as well as a signature, which secures the constraint against falsification;
  checking the signature with the verifier to see whether a valid constraint is present, and transmitting this constraint to the limiter;
  transmitting to the dispenser, from a source external to the apparatus, one or more dispense tasks, the dispenser thereupon dispensing of one or more bank papers, and, for each bank paper to be dispensed, determines one or more value features and transmitting these value features to the limiter;
  producing a blocking signal with the limiter as long as no valid constraint was transmitted by the verifier or the value features transmitted by the payment unit do not correspond to the constraint;
  preventing dispensing of the bank papers determined by the dispense tasks,
  wherein, the verifier has stored in it a separate serial number, the enable message contains a further serial number, and in the verifier the further serial number is compared with the separate serial number for equality.

18. A method for the operation of an apparatus for dispensing bank papers enclosing a dispenser, a verifier and a limiter, comprising the steps of:
  transmitting an enable message from a source external to the apparatus to the verifier, which enable message contains a constraint in the form of one or more limit values, as well as a signature, which secures the constraint against falsification;
  checking the signature with the verifier to see whether a valid constraint is present, and transmitting this constraint to the limiter;
  transmitting from a source external to the apparatus to the dispenser one or more dispense tasks, the dispenser thereupon dispensing of one or more bank papers, and, for each bank paper to be dispensed, determines one or more value features and transmitting these value features to the limiter;
  producing a blocking signal with the limiter as long as no valid constraint was transmitted by the verifier or the value features transmitted by the payment unit do not correspond to the constraint;

preventing dispensing of the bank papers determined by the dispense tasks, wherein, in addition to the constraint, the signature secures further indications, in particular a transaction number and the signature is a cryptographically secured check sum.

19. A method for the operation of an apparatus for dispensing bank papers enclosing a dispenser, a verifier and a limiter, comprising the steps of:

transmitting an enable message from a source external to the apparatus to the verifier, which enable message contains a constraint in the form of one or more limit values, as well as a signature, which secures the constraint against falsification;

checking the signature with the verifier to see whether a valid constraint is present, and transmitting this constraint to the limiter;

transmitting to the dispenser, from a source external to the apparatus, one or more dispense tasks, the dispenser thereupon dispensing of one or more bank papers, and, for each bank paper to be dispensed, determines one or more value features and transmitting these value features to the limiter;

producing a blocking signal with the limiter as long as no valid constraint was transmitted by the verifier or the value features transmitted by the payment unit do not correspond to the constraint;

preventing dispensing of the bank papers determined by the dispense tasks, wherein, the enable message contains a testable redundancy and is encrypted.

20. A method for the operation of an apparatus for dispensing bank papers enclosing a dispenser, a verifier and a limiter, comprising the steps of:

transmitting an enable message from a source external to the apparatus to the verifier, which enable message contains a constraint in the form of one or more limit values, as well as a signature, which secures the constraint against falsification;

checking the signature with the verifier to see whether a valid constraint is present, and transmitting this constraint to the limiter;

transmitting to the dispenser, from a source external to the apparatus, one or more dispense tasks, the dispenser thereupon dispensing of one or more bank papers, and, for each bank paper to be dispensed, determines one or more value features and transmitting these value features to the limiter;

producing a blocking signal with the limiter as long as no valid constraint was transmitted by the verifier or the value features transmitted by the payment unit do not correspond to the constraint;

preventing dispensing of the bank papers determined by the dispense tasks, wherein, the enable message contains a transaction number that is valid only once, and in the verifier there is stored a list of transaction numbers from which each transaction number used is deleted.

21. The method according to one of claims 17, 18, 19, or 20 wherein:

the value features comprise a numerical value that is commensurate with a limit value of the enable message, and the numerical values of the bank papers respectively to be dispensed are respectively summed to form a target sum, and the limiter checks whether the constraint is fulfilled by checking whether the target sum is smaller than the limit value.

22. The method according to one of claims 16 or 21, wherein the signature is a cryptographically secured check sum.

23. A bank paper dispensing system comprising:

an authentication unit configured to receive a bank paper dispensing transaction request from a user and to issue a transaction request signal comprising a desired transaction amount, said authentication unit comprising a module via which the user can input data;

a control unit configured to receive the bank paper dispensing transaction request signal from the authentication unit and to issue a dispensing task signal which includes dispensing task information comprising the desired transaction amount and an enable signal which includes an electronic signature relating to the transaction;

a dispenser from which bank papers are physically dispensed, said dispenser configured to receive the enable signal and the dispensing task signal from the control unit and then to stage the bank papers for dispensing and to issue a numerical value signal for each set of bank papers staged to be dispensed during the requested transaction, the dispenser also configured to receive a transaction blocking signal and to react upon receipt thereof in a manner effective to block dispensing of bank paper;

a verifier unit which is controlled independently from the dispenser; said verifier unit also configured to receive the enable signal and to issue a validity signal identifying whether the enable signal is falsified based on the electronic signature and a valid signature; and a limiter unit which receives the validity signal from the verifier unit and said numerical value signal from said dispenser and which is configured to issue the transaction blocking signal whenever said validity signal is not issued or a desired transaction amount exceeds said numerical value signal, wherein, the dispenser, verifier and limiter are securely enclosed within a housing separate and apart from the control unit and the authentication unit.

24. The bank paper dispensing system of claim 23, wherein the dispenser, the verifier and the limiter are positioned within a safe.

25. The bank paper dispensing system of claim 24, wherein the authentication unit is housed within a second safe inside the safe housing the dispenser, the verifier and the limiter.

26. The bank paper dispensing system of claim 23, further comprising an authorization processor in communication with the control unit and configured to log bank paper dispensing transaction requests and to authorize such requests upon logging thereof.

27. The bank paper dispensing system of claim 24, wherein the verifier is contained in a test module that comprises an interface, a processor and a memory, and in which access to the memory via the interface can take place only with intervention by the processor.

28. The apparatus of claim 27, wherein the test module in addition comprises the limiter.

29. The apparatus of claim 27 or 28, wherein the test module comprises a permanent memory in which the dispensings carried out are recorded.

30. The apparatus of claim 27 or 28, wherein the test module is a chip card.

* * * * *